(12) United States Patent
Eickhoff

(10) Patent No.: US 7,811,690 B2
(45) Date of Patent: Oct. 12, 2010

(54) PROTON EXCHANGE MEMBRANE FUEL CELL

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1363 days.

(21) Appl. No.: 11/257,738

(22) Filed: Oct. 25, 2005

(65) Prior Publication Data

US 2007/0092767 A1  Apr. 26, 2007

(51) Int. Cl.
    *H01M 8/04* (2006.01)
(52) U.S. Cl. .............................. 429/17; 429/19; 429/39
(58) Field of Classification Search .................... 429/29, 429/44, 17, 19, 39
    See application file for complete search history.

(56) References Cited

U.S. PATENT DOCUMENTS

| 3,649,360 | A | 3/1972 | Bloomfield et al. |
| 4,155,712 | A | 5/1979 | Taschek |
| 4,261,955 | A | 4/1981 | Bailey, Jr. et al. |
| 4,614,204 | A | 9/1986 | Dolejs |
| 5,346,777 | A | 9/1994 | Namba et al. |
| 5,372,617 | A | 12/1994 | Kerrebrock et al. |
| 5,458,989 | A | 10/1995 | Dodge |
| 5,759,712 | A | 6/1998 | Hockaday |
| 5,853,910 | A | 12/1998 | Tomioka et al. |
| 5,914,200 | A | 6/1999 | Schabert et al. |
| 6,093,501 | A | 7/2000 | Werth |
| 6,395,414 | B1 | 5/2002 | Clingerman et al. |
| 6,432,566 | B1 | 8/2002 | Condit et al. |
| 6,558,832 | B1 | 5/2003 | Bruck et al. |
| 6,576,358 | B2 | 6/2003 | Gebhardt et al. |
| 6,582,842 | B1 | 6/2003 | King |
| 6,844,100 | B2 | 1/2005 | Bourgeois et al. |
| 6,979,508 | B2 | 12/2005 | Gurin et al. |
| 7,393,369 | B2 | 7/2008 | Shurtleff |
| 2002/0150804 | A1 | 10/2002 | Srinivasan et al. |

(Continued)

FOREIGN PATENT DOCUMENTS

| DE | 10050554 | 4/2002 |
| DE | 10050554 A1 | 4/2002 |
| EP | 1469545 A2 | 10/2004 |
| WO | WO-0109519 A1 | 8/2001 |
| WO | WO-2004075375 A2 | 9/2004 |

OTHER PUBLICATIONS

Pasaogullari, Ugur, "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California,(Nov. 13-20, 2004),1-9.

(Continued)

*Primary Examiner*—Patrick Ryan
*Assistant Examiner*—Ben Lewis
(74) *Attorney, Agent, or Firm*—Schwegman, Lundberg & Woessner, P.A.

(57) ABSTRACT

A power generator comprising a hydrogen generator and a fuel cell stack having an anode exposed to hydrogen from the hydrogen generator and a cathode exposed to an ambient environment. Hydrophobic and hydrophilic layers are used to promote flow of water away from the cathode. A diffusion path thus separates the fuel cell cathode from the hydrogen generator. In one embodiment, water vapor generated from the fuel cell substantially matches water used by the hydrogen generator to generate hydrogen.

11 Claims, 5 Drawing Sheets

U.S. PATENT DOCUMENTS

| | | | |
|---|---|---|---|
| 2002/0182459 | A1 | 12/2002 | Hockaday et al. |
| 2003/0228252 | A1 | 12/2003 | Shurtleff |
| 2004/0052723 | A1 | 3/2004 | Jorgensen |
| 2004/0062978 | A1 | 4/2004 | Yazici |
| 2004/0161646 | A1* | 8/2004 | Rezachek et al. ............. 429/19 |
| 2004/0202903 | A1 | 10/2004 | deVos et al. |
| 2005/0142424 | A1 | 6/2005 | Homma et al. |
| 2005/0158595 | A1 | 7/2005 | Marsh et al. |
| 2005/0181245 | A1 | 8/2005 | Bonne et al. |
| 2005/0249986 | A1 | 11/2005 | McLean |
| 2006/0134487 | A1* | 6/2006 | Wang et al. .................. 429/30 |
| 2006/0234093 | A1 | 10/2006 | Schaefer et al. |
| 2007/0184312 | A1 | 8/2007 | Eickhoff |

OTHER PUBLICATIONS

"U.S. Appl. No. 11/351,175, Non-Final Office Action mailed Jul. 9, 2008", 10 pgs.

"U.S. Appl. No. 11/351,175, Response filed Oct. 21, 2009 to Non Final Office Action mailed Jul. 23, 2009", 11 pgs.

"U.S. Appl. No. 11/353,571, Non-Final Office Action mailed Aug. 19, 2009", 9 pgs.

"U.S. Appl. No. 11/353,571, Response filed Nov. 19, 2009 to Non-Final Office Action mailed Aug. 19, 2009", 8 pgs.

"Chinese Application No.200680048951.X, First Action mailed Sep. 4, 2009", (w/ English Translation), 14 pgs.

"European Application Serial No. 06826323.5, Office Action Received mailed Jul. 21, 2009", 3 pgs.

"European Application Serial No. 07717606.3, Office Action mailed Dec. 5, 2008", 3 pgs.

"European Application Serial No. 07717606.3, Response filed Jun. 2, 2009 to Office Action mailed Dec. 5, 2008", 2 pgs.

"International Application Serial No. PCT/US2006/040984, International Search Report mailed Oct. 25, 2007", 6 pgs.

"International Application Serial No. PCT/US2006/040984, Written Opinion mailed Oct. 25, 2007", 12 pgs.

"International Application Serial No. PCT/US2007/062021, International Search Report mailed Sep. 4, 2007", 5 pgs.

"International Application Serial No. PCT/US2007/062021, Written Opinion mailed Sep. 4, 2007", 9 pgs.

"U.S. Appl. No. 11/351,175 Response filed Jan. 13, 2010 to Restriction mailed :", 6 pgs.

"U.S. Appl. No. 11/351,175, Restriction Requirement mailed Jan. 6, 2010", 7 pgs.

\* cited by examiner

PROTON EXCHANGE MEMBRANE FUEL CELL

BACKGROUND

In some prior proton exchange membrane (PEM) fuel cell based power generator, a pneumatic valve is used to control a hydrogen generating chemical reaction that feeds hydrogen oxygen PEM fuel cells. The valve comprises a substantial portion of the power generator volume and weight, and thus reduces the energy density and specific energy of the power generator.

PEM fuel cells use a simple chemical reaction to combine hydrogen and oxygen into water, producing electric current in the process. Hydrogen may be produced by a chemical reaction between a fuel, such as lithium aluminum hydride and water vapor. At an anode, hydrogen molecules are ionized by a platinum catalyst, and give up electrons. The PEM allows protons to flow through, but not electrons. As a result, hydrogen ions flow through the PEM to a cathode, while electrons flow through an external circuit. As the electrons travel through the external circuit, they can perform useful work by powering an electrical device such as an electric motor, light bulb or electronic circuitry. At the cathode, the electrons and hydrogen ions combine with oxygen to form water. The byproducts of the reaction are water and heat.

In some power generators, water tends to accumulate at a cathode. The water can block pores, and hence the pathways for reactant species, leading to a decrease in power generation.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The detailed description describes multiple embodiments, including a valveless power generator which may include water recycling.

Figure 1:
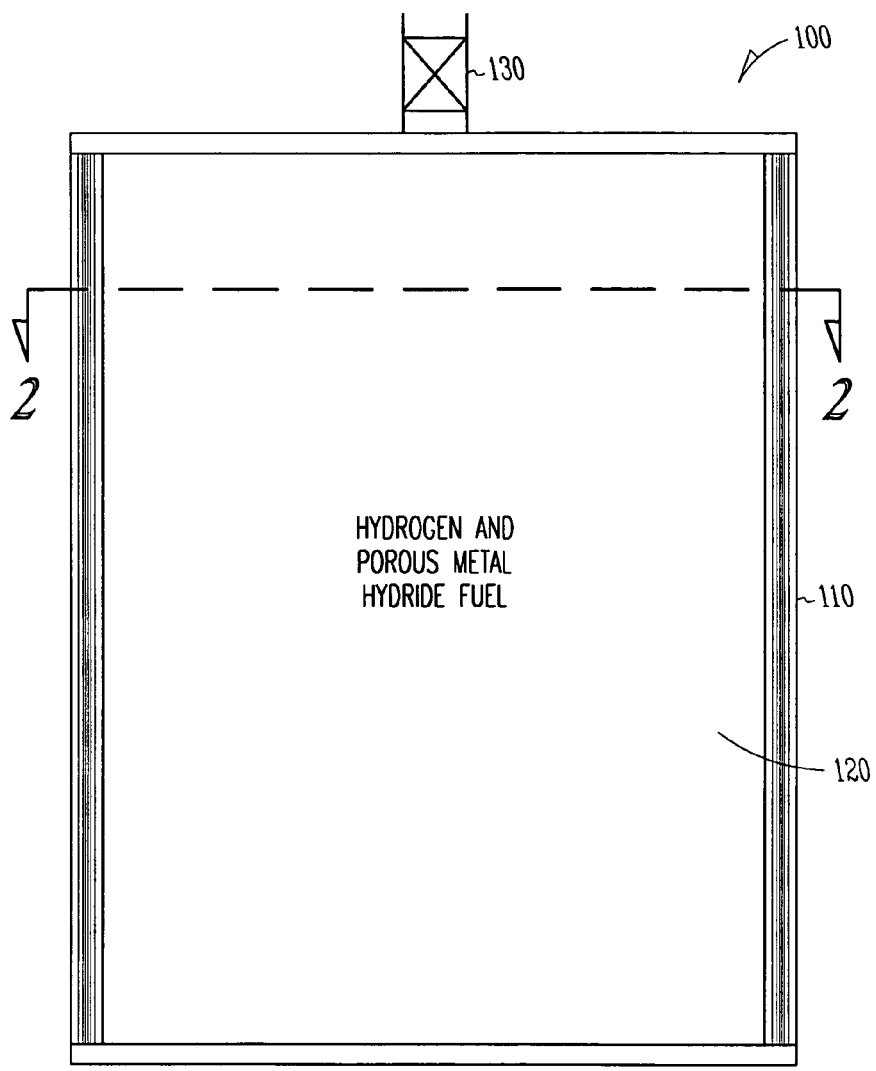
FIG. 1 is a cross section view of a power generator according to an example embodiment.
Figure 2:
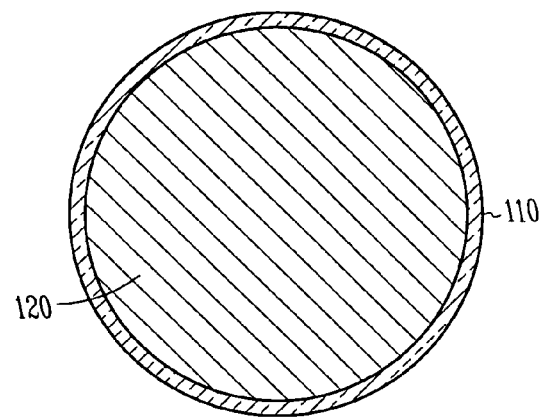
FIG. 2 is a top view cross section of a power generator according to an example embodiment.

FIG. 1 is a front cross section view of a power generator 100. FIG. 2 is a top cross section view of the power generator 100. The power generator comprises a fuel cell stack 110 that is exposed to air. The power generator 100, in one embodiment is built as a hollow cylinder with two ends, and surrounds a fuel 120. Other geometries for the shape of the power generator include rectangular solids, spheres, and other non geometrical shapes. In one embodiment, the fuel is a hydrogen generating fuel that is used by the generating stack 110 to generate electricity. The fuel in one embodiment comprises a hydrogen and porous metal hydride fuel. The fuel cell stack 110 combines with oxygen from the air to create water and electricity.

A pressure relief valve 130 may be used to relieve pressure should excess hydrogen be generated. The relief valve may be located on the power generator with access to the hydrogen generated by the fuel. The porous nature of the fuel allows the relief valve to be located on one of the ends of the power generator. In one embodiment, the pressure relief valve 130 operates as a safety valve to prevent explosion. The pressure relief valve 130 vents hydrogen to the atmosphere or ambient in one embodiment if the internal pressure of the power generator rises above a predetermined value, such as 10 to 100 PSI above ambient pressure. The valve may close following relief of the internal pressure, enabling the power generator to resume normal operation.

Figure 3A:
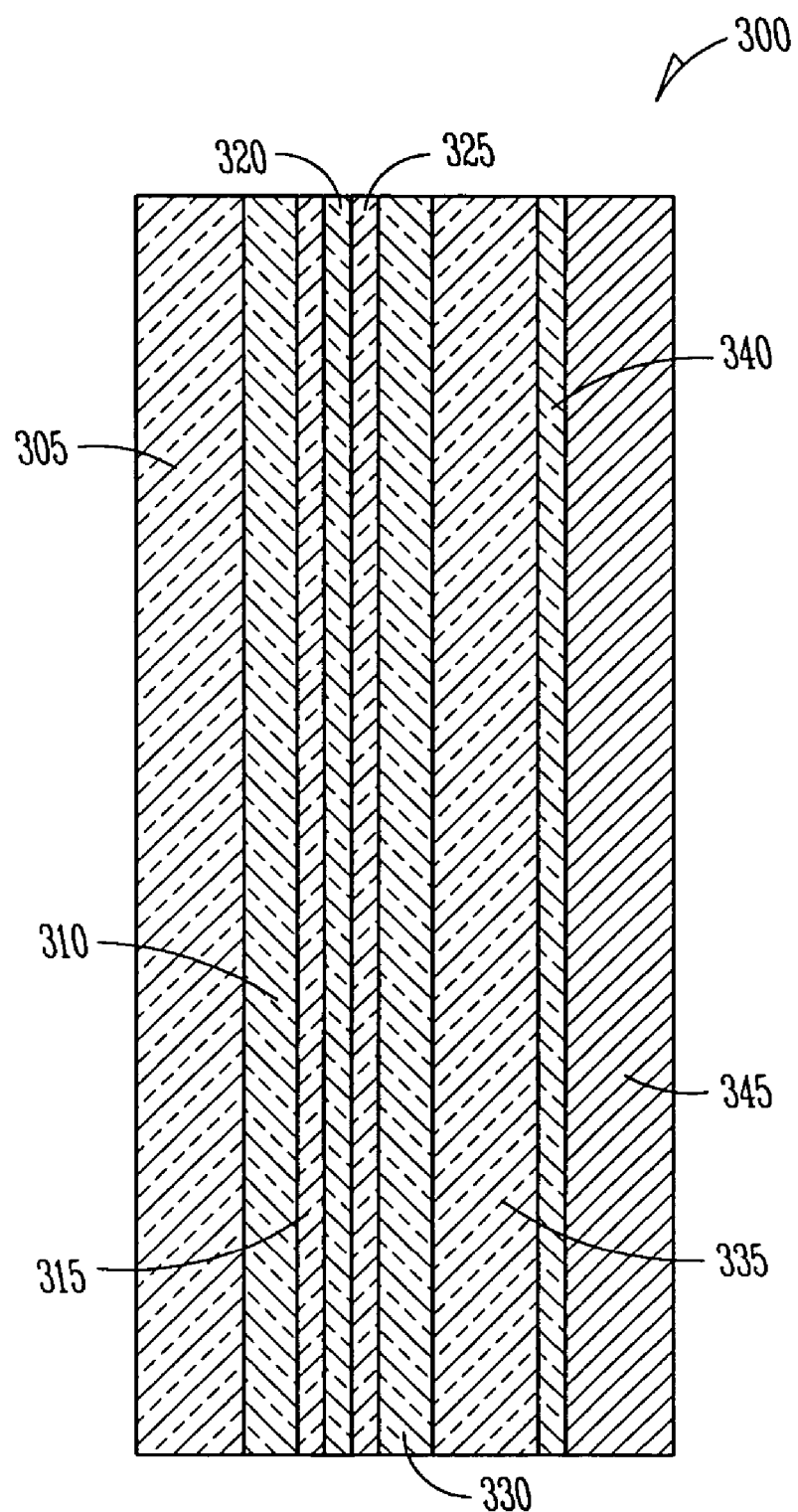
FIG. 3A is a cross section of a fuel cell stack according to an example embodiment.

FIG. 3A illustrates a cross section of a fuel cell stack 300. A cathode current collector 305 is formed on the outside of the fuel cell stack 300, and is exposed to air. Pores are formed in the current collector 305 to allow air to pass through. A cathode gas diffusion layer (GDL) 310 is coupled to the cathode current collector. A hydrophobic micro porous layer 315 is formed on the cathode GDL and separates the cathode GDL 310 from a catalyst coated proton exchange membrane (PEM), such as a Nafion® membrane layer 320.

A hydrophilic micro porous layer 325 separates layer 320 from an anode GDL 330, which in turn is coupled to an anode current collector 335. The anode current collector 335 has pores formed therein to allow hydrogen to pass through to the anode. The anode current collector 335 is separated by water vapor and hydrogen permeable membrane 340. Membrane 340 is liquid water and particulate impermeable. Membrane 340 is used to separate the fuel 345 from the anode current collector 335. The layers between the cathode and the hydrogen generating fuel serve to separate the cathode from the hydrogen generator containing the fuel 345 that generates hydrogen when exposed to water vapor and provide a diffusion path.

Figure 3B:
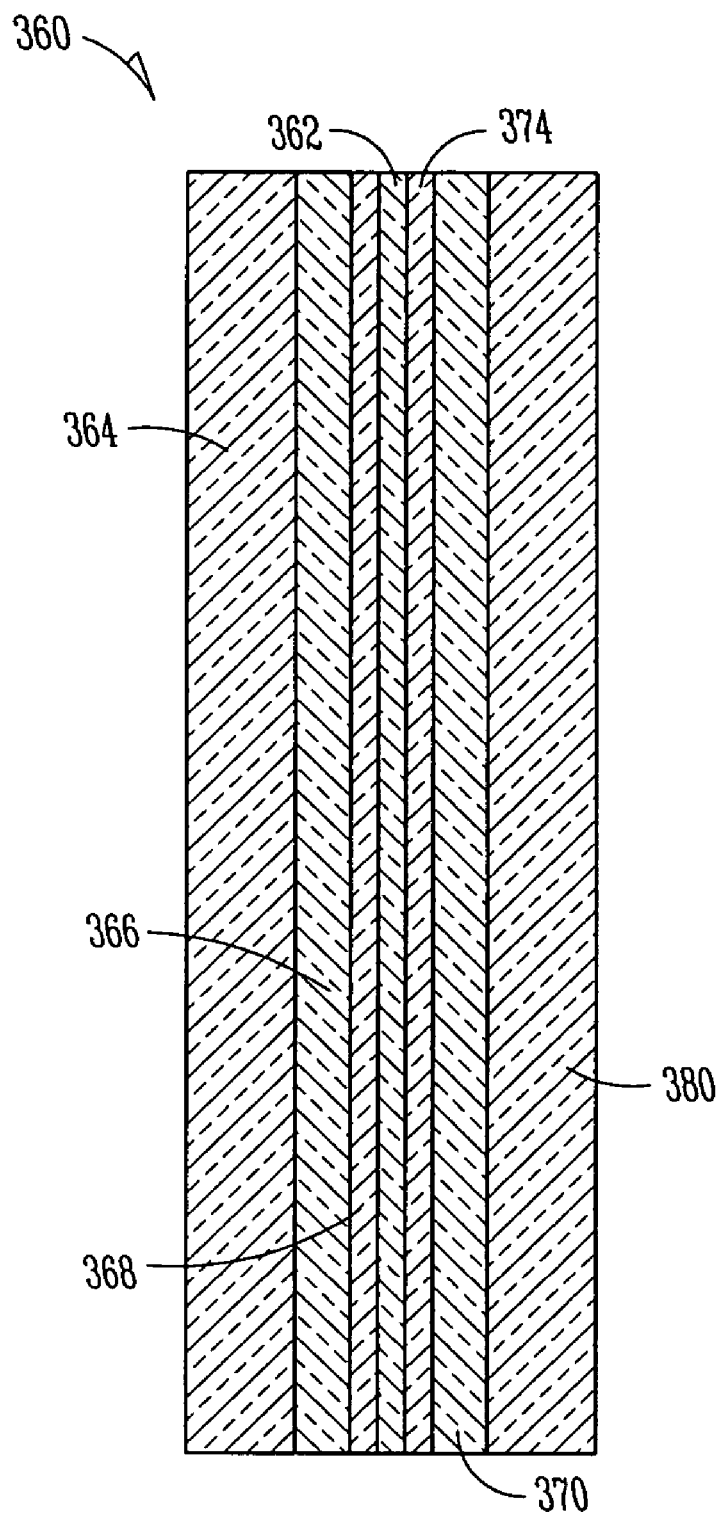
FIG. 3B is a cross section of an alternative fuel cell stack according to an example embodiment.

FIG. 3B illustrates an alternative fuel cell stack 360. In one embodiment, a proton exchange member 362 comprises a perfluorinated membrane such as perfluorosulfonic acid or perfluorocarboxylic acid, or a hydrocarbon membrane or a composite membrane. The fuel cell stack is composed of a cathode current collector 364, cathode gas diffusion electrode 366 with micro porous layer (this gas diffusion electrode with a hydrophobic MPL is the same as the gas diffusion layer, except that it has the catalyst 368 on the surface of the micro porous layer, rather than on the Nafion®) proton exchange membrane (without catalyst) anode gas diffusion electrode 370 with a hydrophobic MPL having a catalyst 374 on the surface of the MPL, and anode current collector 380.

The gas diffusion electrodes are one piece in one embodiment with three layers. The three layers are the gas diffusion layer (GDL)(carbon paper), the micro porous layer (MPL) (PTFE or PVDF) and the catalyst layer (carbon/platinum).

Figure 4:
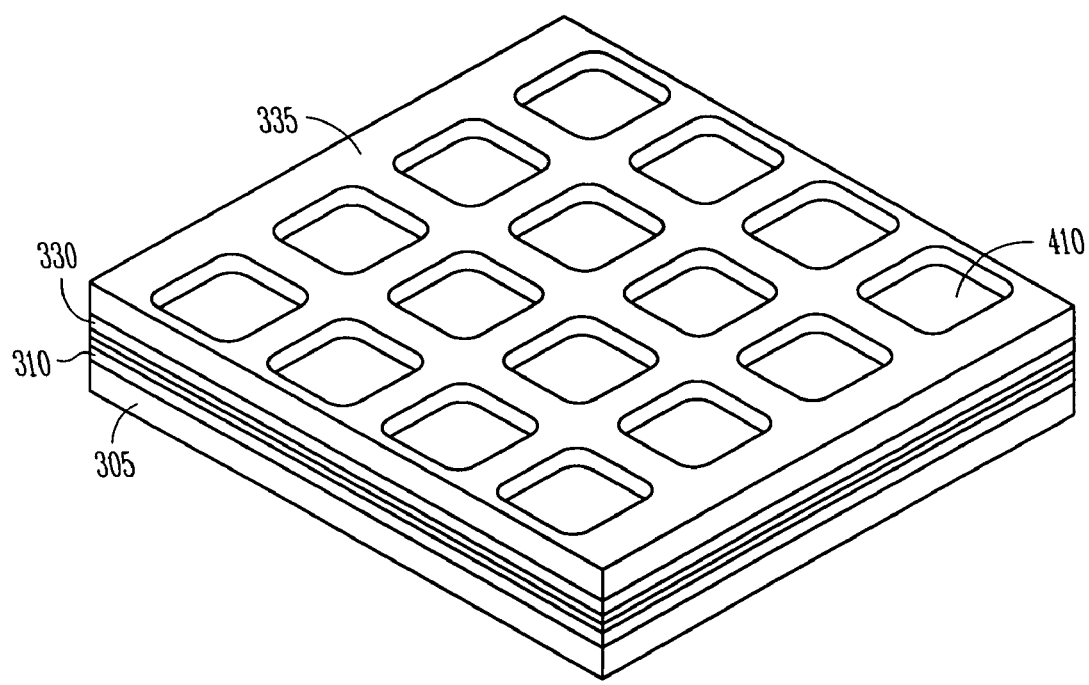
FIG. 4 is a perspective view of a fuel cell stack according to an example embodiment.

FIG. 4 is a perspective view of the fuel cell stack 300. Anode current collector 335 is illustrated, showing multiple pores 410. In one embodiment, the pores are relatively large to allow hydrogen to move through to the anode gas diffusion layer 330.

Water used in the hydrogen generator is generated in the fuel cells by the electrochemical reaction between oxygen from the ambient and hydrogen from the hydrogen generator. At a constant electrical load, the water generated at the fuel cells is exactly, or substantially matches, the amount of water needed to generate the hydrogen consumed in the electrochemical reaction, thus the reaction is self sustaining when the water generated is recycled. The term substantially matches takes into account that water generated at the fuel cells may not exactly match the water needed to generate the hydrogen. Water vapor from ambient may also be transported, and some water vapor may be lost to ambient. The relief valve 130 is provided in case the reaction generates excess hydrogen.

The hydrophobic coating on the cathode GDL and the hydrophilic coating on the anode GDL promote back permeation of water (from cathode to anode) through the PEM by increasing the hydraulic pressure difference across the PEM. A hygroscopic material (hydrogen generating hydride fuel) at the anode further increases the hydraulic pressure difference across the PEM by reducing the humidity (vapor pressure) at the cathode. A diffusion path is thus provided between the fuel cell cathode and the hydrogen generator.

Power generator 100 is a valveless power generator that produces power without the need for moving parts. Further, there are no limits on power generation that are imposed by power generators that use a valve to control diffusion of water vapor from the fuel cells to the fuel. Further, the valveless power generator may provide a self regulating water flow. The rate of hydrogen generation is regulated according to the electrical power drawn from the fuel cell without the need for moving parts. Still further, by not requiring a valve to operate, the fuel cells may occupy the surface of the power generator, with fuel occupying a large volume of the power generator. Removing the valve frees up a significant portion of the volume of the power generator for additional fuel, improving energy density and specific energy of the power generator.

Many different sizes of power generators may be formed, such as those having the same volumetric shape as existing batteries, or yet other shapes as desired. The power generators may be packaged in containers that provide continuous access of the cathode to ambient air in one embodiment, either through selected holes in the containers, or through a gas permeable container. The container may have leads to the current collection plates. Similarly, a container may have multiple fuel cells electrically coupled in series or parallel to provide desired voltages and current capabilities.

In some embodiments, the power generator does not require liquid water. Water vapor is provided from the cathode region of the fuel cell, and air is provided immediately adjacent to the cathode. Water transport is through the membrane of the fuel cell. A path for water is provided from the cathode region of the fuel cell and air immediately adjacent to the cathode, wherein the path is not through the fuel cell membrane. Water transport through the fuel cell varies with differential pressure. The water transport rate decreases is the pressure differential increases.

In various embodiments, a micro porous layer is added to the fuel cell membrane to encourage water transport from the cathode to the anode. Hydrophobic layers are added to the fuel cell to encourage water transport from the cathode to the anode. Hydrophilic layers are also added to the fuel cell to encourage water transport from the cathode to the anode.

The fuel cell may be produced with micromachining processes, and a protective cover may be provided for the cathode to prevent excess exposure to air and water vapor when power generation is not desired. The cap may be removed when power generation is desired.

Water flux at the cathode, $J_M$, is a function of at least three components, diffusion, osmotic drag, and hydraulic permeation:

$$J_M = \frac{-D\Delta C_{C-A}}{\delta_M} + \frac{n_d I}{F} - \frac{K\Delta P_{C-A}\rho}{\mu M_{H_2O}}$$

If water flux at the cathode is zero, the current (I) is:

$$I = \frac{F}{n_d}\left[\frac{\Delta C_{C-A}}{\delta_M} + \frac{K\Delta P_{C-A}\rho}{\mu M_{H_2O}}\right]$$

where:

$$\Delta P_{C-A} = P_{Cathode} - P_{Anode} - \frac{2\sigma\cos(\theta_C)}{r_C}$$

Current density (I) is a function of the absolute pressure difference across the PEM membrane.

$$I = f(P_{Cathode} - P_{Anode})$$

Since water generation, and therefore hydrogen generation are a function of current, a feedback mechanism is built-in, and controls pressure and keeps the power generator stable. Thus, a control valve is not necessary.

$$H_2O_{Generation} \propto H_{2\,Generation} \propto I$$

As previously indicated, water flux at the fuel cell cathode is the sum of at least three modes of water transport. Water diffusion in the PEM membrane, electro osmosis, and hydraulic permeation.

Water transport into the power generator by diffusion (from cathode to anode) is promoted by using thin membranes and using a large water concentration difference across the membrane.

Water transport out of the power generator by electro osmosis (from anode to cathode) is a function of current density, and can be minimized with low current density.

Water transport into the power generator (from cathode to anode) by hydraulic permeation is promoted by using a hydrophobic coating and small pore size on the cathode GDL and a hydrophilic coating and large pore size on the anode GDL. Hydraulic permeation is increased by using a hydroscopic fuel that creates a low humidity (low hydraulic pressure) atmosphere at the anode. Hydraulic permeation can also be increased by setting up a pressure differential across the fuel cell membrane. This can be accomplished by operating the power generator at lower than ambient hydrogen pressure.

Several methods may be used to increase water flux from the cathode to the anode. Parameters, such as membrane thickness ($\delta_M$) may be minimized. The contact angle ($\theta_C$) of the cathode micro porous layer may be maximized. The pore radius ($r_C$) of the cathode micro porous layer may also be minimized. The contact angle ($r_C$) of the anode micro porous layer may be minimized. Also, maximizing pore radius ($\theta_C$) of the anode micro porous layer helps to increase water flux from the cathode to the anode. In one embodiment, the parameters should not be minimized or maximized, because at their extremes they negatively affect other factors that limit power generator performance.

The relationship between pressure difference across the membrane and hydraulic permeation allows the power generator to regulate the chemical reaction without use of a valve. Water is recycled in such a steady state condition. The above parameters that affect water flow may be balanced to provide such recycling. The micro porous layers (MPL) are composed of 100 to 500 nm carbon or graphite particles mixed with a polymeric binder, usually PTFE or PVDF. The pore size of the cathode MPL can range from 100 to 1000 nm, the thickness can range from 10 to 100 um, and the contact angle from 90 to 120 degrees. The pore size of the anode MPL can range from 500 to 2000 nm, the thickness from 10 to 100 um, and the contact angle from 50 to 90 degrees. Each of these parameters and ranges are approximations, and may be exceeded in various embodiments.

For the steady state condition, in which the load is constant, the rate at which water is generated by the fuel cells is equal to the rate at which water is consumed by the hydrogen generating reaction. The reaction is self sustaining and the pressure inside the generator is constant. If the load is increased, the pressure inside the power generator is reduced as hydrogen is consumed by the fuel cells. The drop in internal pressure causes the hydraulic permeation to increase, thus more water is transported into the hydrogen generator and more hydrogen is generated, and a new steady state is achieved at a lower pressure.

If the load is reduced, pressure will rise inside the power generator, which will reduce hydraulic permeation and hydrogen generation, and a new steady state is achieved at a higher pressure. At no load, hydrogen permeation losses through the membrane will substantially match the hydraulic permeation rate, and a maximum steady state pressure is achieved. In one embodiment, a relief valve may be provided proximate the hydrogen generator to relieve pressure should excess hydrogen be generated for various reasons.

Figure 5:
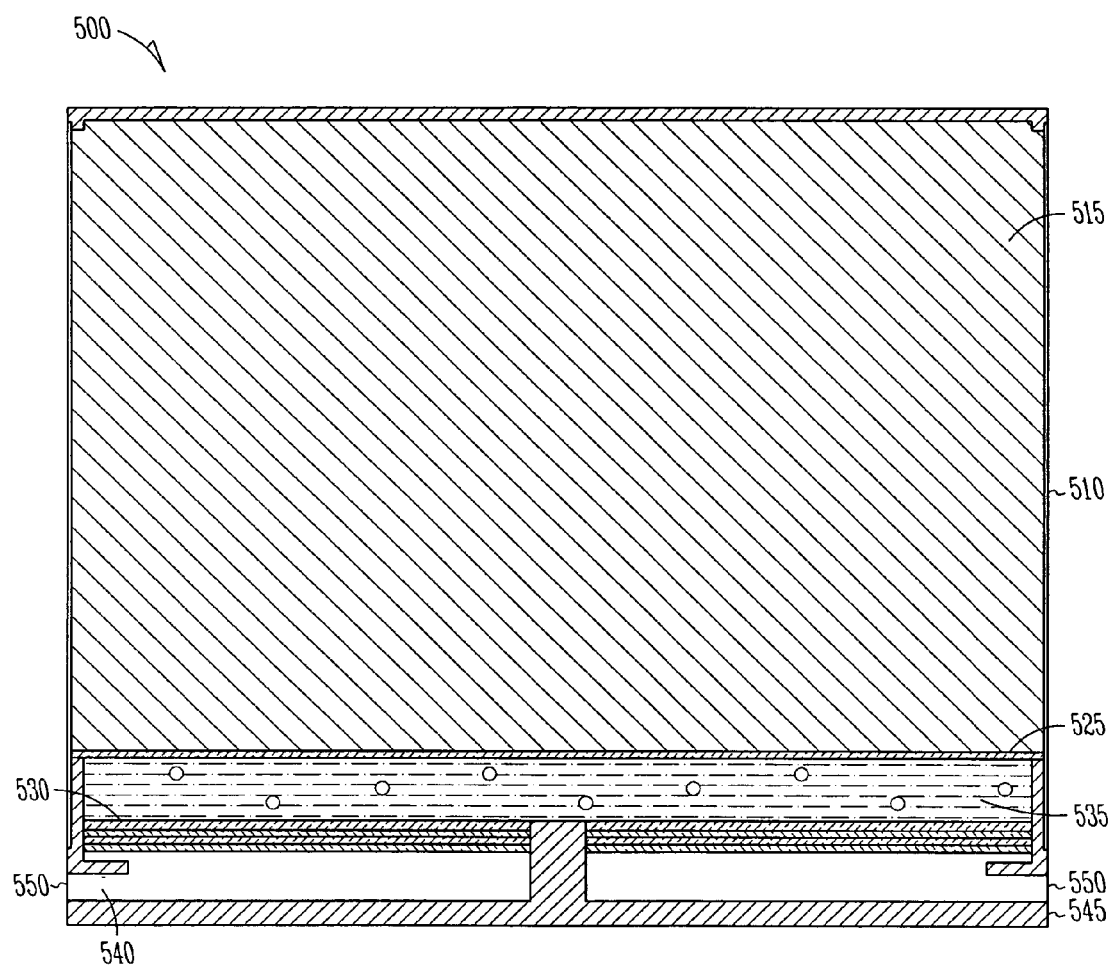
FIG. 5 is a cross section view of an alternative power generator according to an example embodiment.

FIG. 5 illustrates a further embodiment of a power generator 500. A container 510 holds a hydrogen generating fuel 515, which in one embodiment occupies a substantial volume of the power generator. A membrane, 520, such as a Gore Tex water vapor and hydrogen permeable membrane separates the fuel 515 from a fuel cell assembly 530. The fuel cell assembly 530 may be formed in the same manner as fuel cell stack 300.

Fuel cell assembly 530 in one embodiment is separated from the membrane 520 by an open space 535. Open space 535 provides a space for the hydrogen to accumulate and work its way through the ports of the fuel cell stack to the anode and cathode. Thus, in one embodiment, a diffusion path separates the fuel cell cathode from the hydrogen generator. The fuel cell assembly 530 in one embodiment is supported by the container 510. Container 510 also contains openings 540, and a base 545. The openings 540 provide access to ambient air, and the oxygen used in the reaction to produce electricity. Such openings may be restricted to limit the amount of oxygen provided to the cathode to an amount sufficient for desired power generation.

The restriction at the fuel cell cathode allows substantially enough oxygen to diffuse from the ambient to the cathode for a desire power level while restricting diffusion of water vapor from the cathode to the ambient. Openings 540 may also contain an oxygen-permeable water vapor-impermeable membrane 545 positioned between the opening and the cathode, that allows substantially enough oxygen to permeate from the ambient to the cathode for a desired power level while restricting permeation of water vapor from the cathode to the ambient. In one embodiment, the membrane 550 comprises a thin layer or layers of a fluorinated ethylene polymer or propylene (FEP) or perfluoroalkoxy (PFA) to provide high selectivity. Other materials may also operate in a similar manner. Such a membrane may also be used in other embodiments, such for power generator 100, wherein it may surround the cathode.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A power generator comprising:
   a hydrogen generator;
   a fuel cell assembly having an anode exposed to hydrogen from the hydrogen generator and a cathode exposed to an oxygen containing ambient environment;
   a diffusion path separating the fuel cell cathode from the hydrogen generator; and
   wherein water generated from the fuel cell substantially matches water used by the hydrogen generator to generate hydrogen, and wherein the diffusion path is adapted to recycle water generated from the fuel cell without the use of a valve such that the power generator is substantially self regulating and self sustaining without a water reservoir.

2. The power generator of claim 1 wherein water flux at the fuel cell cathode is the sum of three modes of water transport in the fuel cell assembly.

3. The power generator of claim 2 wherein the three modes of water transport comprise water diffusion from anode to cathode, electro osmosis and hydraulic permeation.

4. The power generator of claim 3 wherein water transport by diffusion is promoted by using thin membranes and using a large water concentration difference across the membrane.

5. The power generator of claim 3 wherein water transport by hydraulic permeation is promoted by using a hydrophobic coating and first pore size on the cathode GDL and a hydrophilic coating and a second pore size larger than the first pore size on the anode GDL.

6. The power generator of claim 1 and further comprising a pressure relief valve coupled to the hydrogen generator.

7. The power generator of claim 6 wherein the pressure relief valve vents to ambient when pressure inside the power generator exceeds approximately 10 to 100 PSI above ambient pressure.

8. A power generator comprising:
   a hydrogen generator including a water vapor and hydrogen permeable membrane;
   a fuel cell assembly disposed opposite the hydrogen permeable membrane from the hydrogen generator, the fuel cell having an anode exposed to hydrogen from the hydrogen generator and a cathode exposed to an ambient environment; and
   wherein water generated from the fuel cell substantially matches water used by the hydrogen generator such that the power generator is self sustaining, without a water reservoir, and wherein the diffusion path is adapted to recycle water generated from the fuel cell without the use of a valve.

9. The power generator of claim 8 and further comprising a pressure relief valve coupled to the hydrogen generator.

10. The power generator of claim 9 wherein the pressure relief valve vents to ambient when pressure inside the power generator exceeds approximately 10 to 100 PSI above ambient pressure.

11. A power generator comprising:
    a hydrogen generator;
    a fuel cell assembly having an anode exposed to hydrogen from the hydrogen generator and a cathode exposed to an oxygen containing ambient environment;
    a diffusion path separating the fuel cell cathode from the hydrogen generator; and
    wherein water generated from the fuel cell substantially matches water used by the hydrogen generator to generate hydrogen, and wherein the diffusion path is adapted to recycle water generated from the fuel cell without the use of a valve.

* * * * *